US010676015B2

(12) United States Patent
Yamamoto

(10) Patent No.: US 10,676,015 B2
(45) Date of Patent: Jun. 9, 2020

(54) LAMP UNIT SUPPORT STRUCTURE FOR HEADLIGHT AND HEADLIGHT MANUFACTURING METHOD

(71) Applicant: Honda Motor Co., Ltd., Tokyo (JP)

(72) Inventor: Takao Yamamoto, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/482,825

(22) PCT Filed: Feb. 28, 2017

(86) PCT No.: PCT/JP2017/008021
§ 371 (c)(1),
(2) Date: Aug. 1, 2019

(87) PCT Pub. No.: WO2018/158867
PCT Pub. Date: Sep. 7, 2018

(65) Prior Publication Data
US 2019/0351817 A1 Nov. 21, 2019

(51) Int. Cl.
*B60Q 1/068* (2006.01)
*F21S 41/29* (2018.01)
(Continued)

(52) U.S. Cl.
CPC .......... *B60Q 1/0683* (2013.01); *F21S 41/143* (2018.01); *F21S 41/151* (2018.01); *F21S 41/19* (2018.01); *F21S 41/295* (2018.01)

(58) Field of Classification Search
CPC .... B60Q 1/0683; F21S 41/143; F21S 41/151; F21S 41/19; F21S 41/255; F21S 41/295; F21W 2103/55
See application file for complete search history.

(56) References Cited

U.S. PATENT DOCUMENTS 7,753,575 B2 * 7/2010 Mochizuki ............. B60Q 1/076
362/545
9,500,334 B2 * 11/2016 Iwasaki ................. F21S 41/143
(Continued)

FOREIGN PATENT DOCUMENTS

EP 1935715 A1 6/2008
JP 63-196502 U 12/1988
(Continued)

OTHER PUBLICATIONS

International Search Report (PCT/ISA/210) issued in PCT/JP2017/008021, dated May 16, 2017.
(Continued)

*Primary Examiner* — Peggy A Neils
(74) *Attorney, Agent, or Firm* — Birch, Stewart, Kolasch & Birch, LLP

(57) ABSTRACT

To eliminate a space for adjusting an optical axis, which is provided between an extension and a lamp unit to adjust the optical axis of a headlight. An extension and a lamp unit are contained in a housing. The circumference of the lamp unit is joined to the extension, whereby the lamp unit is fixed to the extension so as to eliminate a space between the circumference of the lamp unit and the extension. The extension is coupled to the housing via an optical axis adjuster. The optical axis adjuster makes the extension and the lamp unit tilt integrally, thereby adjusting the optical axis. Thus, the optical axis is adjustable although a conventional space for adjusting the optical axis is not provided, whereby the appearance of the headlight is improved.

6 Claims, 13 Drawing Sheets

(51) Int. Cl.
*F21S 41/143* (2018.01)
*F21S 41/19* (2018.01)
*F21S 41/151* (2018.01)

(56) References Cited

U.S. PATENT DOCUMENTS

| | | |
|---|---|---|
| 10,495,276 B2 * | 12/2019 | Nakao .................. F21V 29/503 |
| 2006/0215416 A1 | 9/2006 | Lucas et al. |
| 2007/0025105 A1 | 2/2007 | Inoue et al. |
| 2013/0051058 A1 * | 2/2013 | Bako ...................... B60Q 1/068 |
| | | 362/523 |
| 2014/0268843 A1 | 9/2014 | Ruprecht et al. |
| 2018/0087737 A1 * | 3/2018 | Hermitte ............... F21S 41/663 |
| 2018/0142854 A1 | 5/2018 | Nakao et al. |

FOREIGN PATENT DOCUMENTS

| | | |
|---|---|---|
| JP | 2008-76088 A | 4/2008 |
| JP | 2011-171001 A | 9/2011 |
| JP | 2017-10639 A | 1/2017 |
| WO | WO 2013/123537 A1 | 8/2013 |
| WO | WO 2016/203945 A1 | 12/2016 |

OTHER PUBLICATIONS

Extended European Search Report, dated Feb. 5, 2020, for European Application No. 17898881.2.

* cited by examiner

LAMP UNIT SUPPORT STRUCTURE FOR HEADLIGHT AND HEADLIGHT MANUFACTURING METHOD

FIELD

The present invention relates to a lamp unit supporting structure for a headlight having no space between a lamp unit and an extension and also relates to a manufacturing method suitable for the headlight.

BACKGROUND

A headlight for a vehicle, such as a motorcycle, may include a housing that opens toward front side and an outer lens that covers the opening (refer to Patent Literature 1). The housing and the outer lens form a light chamber that houses a lamp unit having a projection lens and a light source. The lamp unit and the housing have an extension disposed therebetween. The whole of the lamp unit is made movable to adjust an optical axis. The extension is provided to make an optical axis adjuster and other components in the housing hardly visible when the inside of the headlight is looked from the outside through the outer lens, thereby improving the appearance.

CITATION LIST

Patent Literature

Patent Literature 1: Japanese Unexamined Patent Application Laid-Open No. 2008-76088

BRIEF SUMMARY

Technical Problem

The headlight as described above has the extension that is fixed in a manner unmovable to the housing side. Thus, in a case in which the lamp unit is made movable in order to adjust the optical axis, a space for the movement of the lamp unit must be secured. Inevitably, a certain space for adjusting the optical axis is provided between the lamp unit and the surrounding extension.

This space for adjusting the optical axis may allow the optical axis adjuster and other components inside the headlight to be partially viewed from the outside and may lessen the original effects of the extension although the extension is provided to improve the appearance. In view of this, it is desirable to eliminate such a space for adjusting the optical axis.

However, the space for adjusting the optical axis is essential in the case of adjusting the optical axis by making the whole of the lamp unit movable, and it is indispensable.

In view of these circumstances, an object of the present application is to enable adjusting the optical axis while dispensing with such a space for adjusting the optical axis.

Solution to Problem

To achieve the above object, according to an aspect of the invention of the present application, a lamp unit (7) is fitted into a lamp hole and is fixed to an extension (6), and the lamp unit (7) and the extension (6) are configured to tilt integrally in adjusting an optical axis by an optical axis adjuster (5). This enables adjusting optical axis without providing a space for adjusting the optical axis between the lamp unit (7) and the extension (6).

At this time, the optical axis adjuster (5) may be provided between the extension (6) and a housing (3), and the optical axis may be adjusted by tilting the extension (6).

On the other hand, the optical axis adjuster (5) may be provided between the lamp unit (7) and the housing (3), and the extension (6) may be supported by the housing (3) via the lamp unit (7). In this case, the optical axis may be adjusted by tilting the lamp unit (7) by the optical axis adjuster (5).

In each of these cases, the extension (6) tilts integrally with the lamp unit (7) in adjusting the optical axis, whereby the extension (6) and the lamp unit (7) keep no space for adjusting the optical axis, therebetween.

A manufacturing method of the headlight includes
fitting the lamp unit (7) into a lamp hole that is provided to the extension (6) made of a thermoplastic resin, and the lamp unit (7) having a light source and a projection lens (11) that is configured to collect light from the light source, overlapping a circumferential edge part of the projection lens (11) on an opaque overlapping portion (31) that is a part surrounding the lamp hole of the extension (6), emitting laser light to the overlapping portion (31) through the circumferential edge part of the projection lens (11), and performing laser welding of the overlapping portion (31) to the circumferential edge part of the projection lens (11) by melting the overlapping portion (31).

Advantageous Effects

The extension (6) is fixed to the lamp unit (7) to enable tilting the extension (6) and the lamp unit (7) integrally in adjusting the optical axis. This eliminates the need to provide a space for adjusting the optical axis between the extension (6) and the lamp unit (7), which is conventionally required for adjusting the optical axis. Thus, the optical axis is adjustable although a space for adjusting the optical axis is not provided, and the inside structure is not viewable from between the lamp unit and the extension, whereby an appearance of the headlight is improved.

In the case of providing the optical axis adjuster (5) between the extension (6) and the housing (3), the optical axis is adjusted by tilting the extension (6) to cause the extension (6) and the lamp unit (7) to tilt at the same time, by the optical axis adjuster (5). Moreover, in the case in which the extension (6) is supported by the housing (3) via the lamp unit (7), and the optical axis adjuster (5) is provided between the lamp unit (7) and the housing (3), the optical axis is adjusted by tilting the lamp unit (7) to cause the lamp unit (7) and the extension (6) to tilt at the same time, by the optical axis adjuster (5).

In the manufacturing method of the headlight of the invention of the present application, the lamp unit (7) is fitted into the lamp hole provided to the extension (6), and the circumferential edge part of the projection lens (11) is overlapped on the overlapping portion (31) that is the part surrounding the lamp hole of the extension (6).

Moreover, laser light is emitted to the overlapping portion (31) through the circumferential edge part of the projection lens (11). The emitted laser light transmits the circumferential edge part of the opaque projection lens (11) and melts the overlapping portion (31). Thus, the circumferential edge part of the projection lens (11) and the extension (6) are joined by laser welding. This enables efficient laser welding using the transparent projection lens (11). That is, the manufacturing method is suitable in manufacturing a headlight having the lamp unit (7) that is fixed to the extension (6).

DETAILED DESCRIPTION

Hereinafter, an embodiment relating to a headlight for a motorcycle will be described with reference to the drawings.

Note that a front-rear direction, a left-right direction, and an up-down direction represent directions relative to a vehicle, and as necessary, a front direction, a left direction, and a right direction are indicated by arrows Fr, LH, and RH, respectively. A front direction of a headlight, a lamp unit, and a projection lens is an emitting direction of light.

Figure 1:
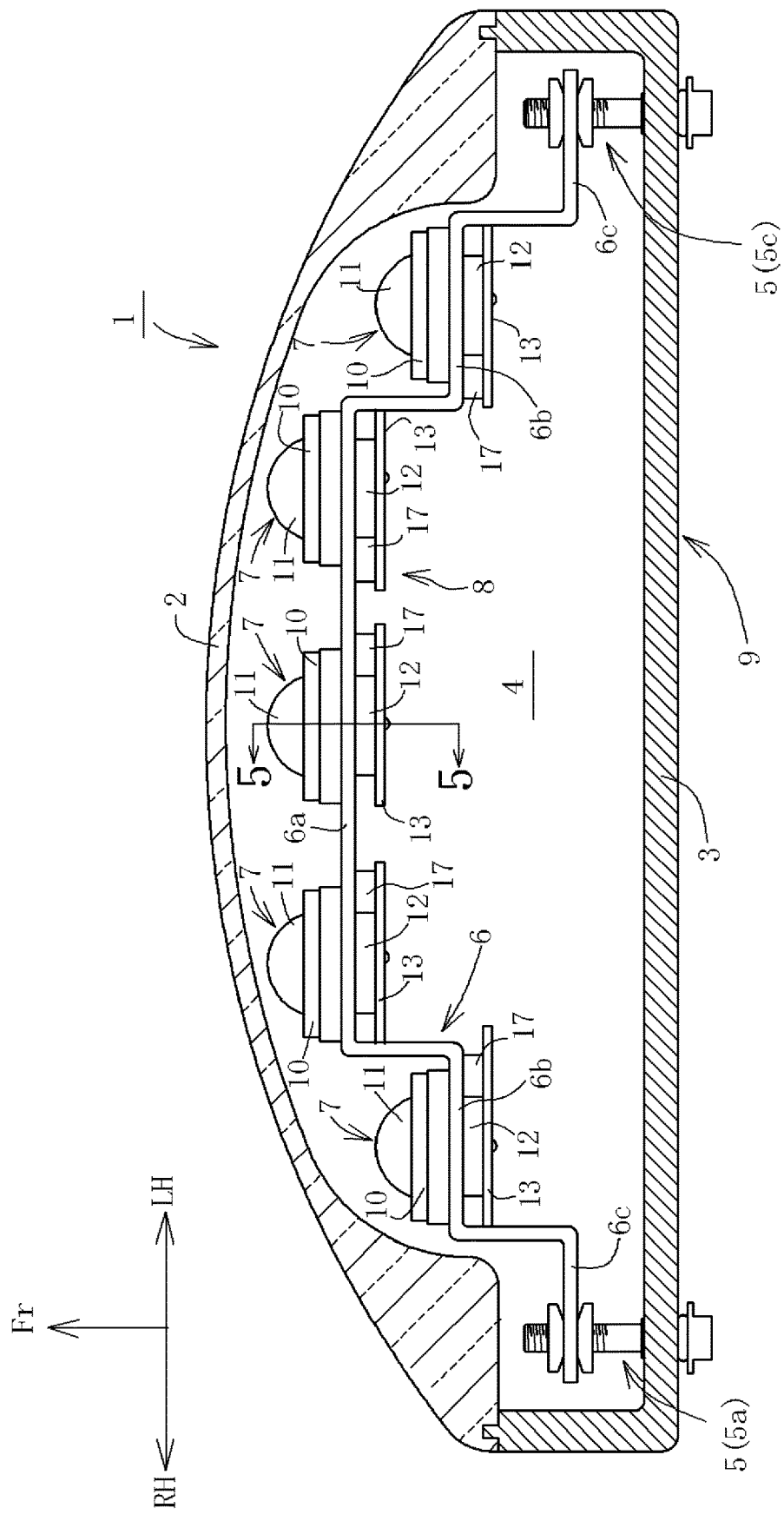
FIG. 1 is a sectional view of a headlight according to a first example.

First, a first example will be described with reference to FIGS. 1 to 12. FIG. 1 is a sectional view of a headlight 1 taken approximately along a line 4-4 in FIG. 2. The headlight 1 shown in the drawing is configured to be disposed at a front part of a motorcycle, which is not shown in the drawing, and to illuminate the front side of the vehicle. The headlight 1 includes an outer lens 2 and a housing 3. The outer lens 2 is provided at a front side of the headlight 1. The housing 3 has an opening that opens toward the front side and that is covered with the outer lens 2. The outer lens 2 and the housing 3 form an internal space as a light chamber 4.

The light chamber 4 contains an extension 6 that is supported via optical axis adjusters 5. The extension 6 supports one or multiple (in this example, five) lamp units 7. The number and the arrangement of the lamp units 7 are not limited to those shown in the drawing and can be freely set.

The integrated body of the lamp units 7 and the extension 6 is referred as a "lamp assembly 8". FIG. 1 shows the entirety of the lamp assembly 8 instead of showing a section thereof.

In addition, the integrated body of the lamp assembly 8 and the housing 3 that are integrated via the optical axis adjusters 5 is referred as a "headlight main unit 9".

The lamp units 7 are arranged in two steps in the front-rear direction. Three of the lamp units 7 are arranged side by side at a position that protrudes most toward the front side. One of the lamp units 7 at each left and right side is arranged rearward of the lamp units 7 at the center, by one step.

The extension 6 is symmetric in the left-right direction in the condition of being disposed as shown in the drawing. The extension 6 is formed in a step shape by changing height in the front-rear direction and has three kinds of steps of an upper step 6a, a middle step 6b, and a lower step 6c.

The shape of the extension 6 is not limited to that shown in the drawing and is formed into any shape in accordance with design and other factors of the headlight 1.

The center part in the left-right direction forms the upper step 6a that protrudes most toward the front side. The upper step 6a supports three of the lamp units 7.

The middle steps 6b are lowered by approximately the height of one lamp unit 7. The middle steps 6b respectively support one of the lamp units 7.

The lower step 6c is the lowest step that is formed at each of left and right ends of the extension 6. The lower step 6c is coupled to the housing 3 via the optical axis adjuster 5.

The lamp unit 7 is fixed to the extension 6 and is integrated therewith, thereby tilting integrally with the extension 6 in adjusting the optical axis.

Figure 2:
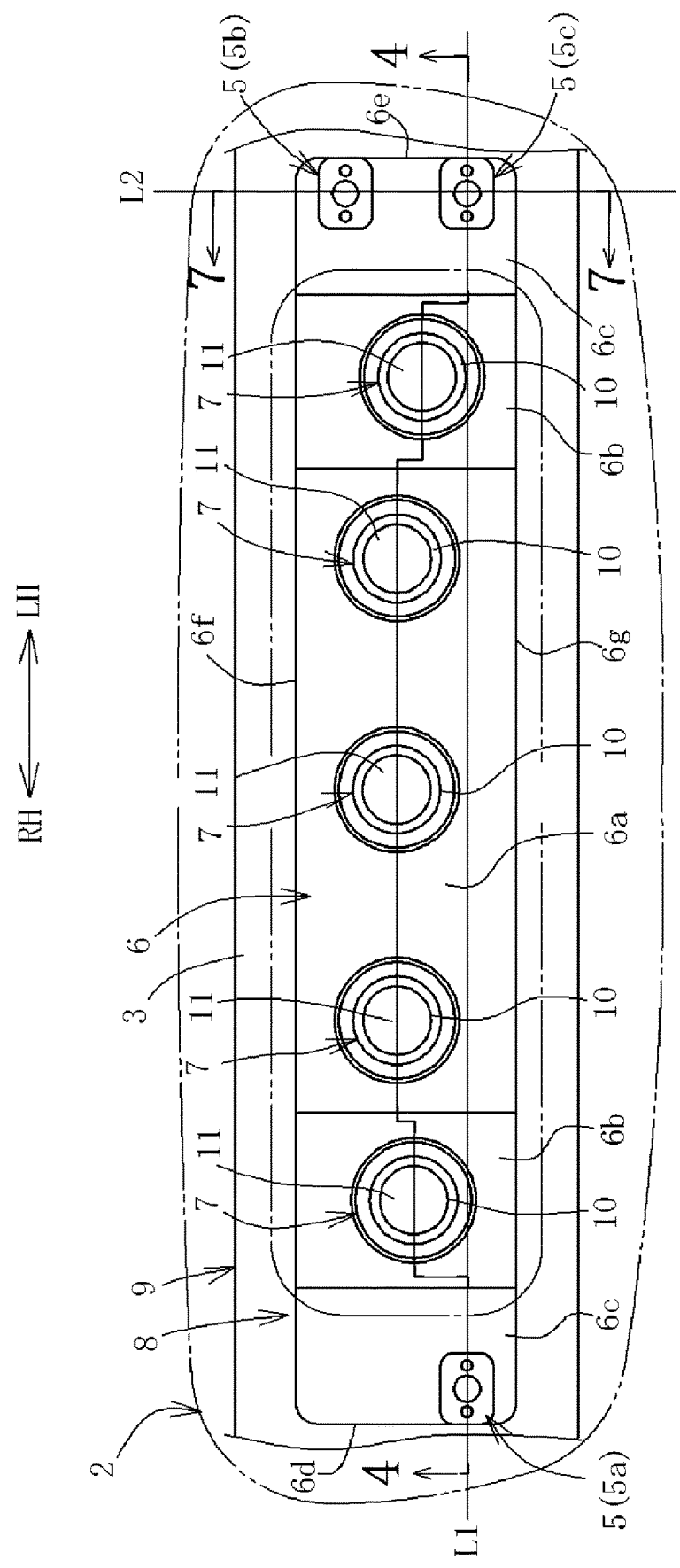
FIG. 2 is a front view of a main unit of the headlight according to the first example.
Figure 3:
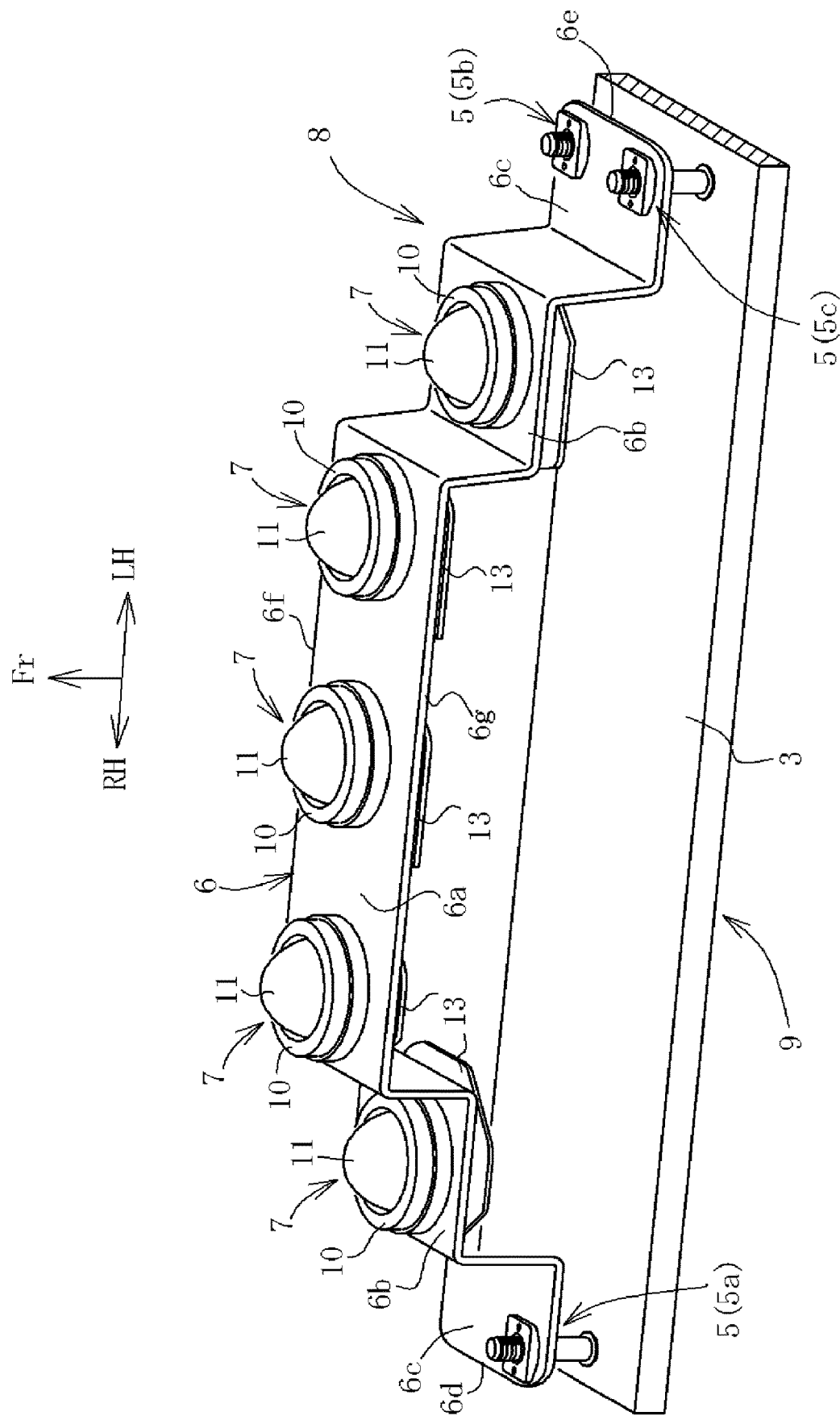
FIG. 3 is a perspective view of the main unit of the headlight.
Figure 4:
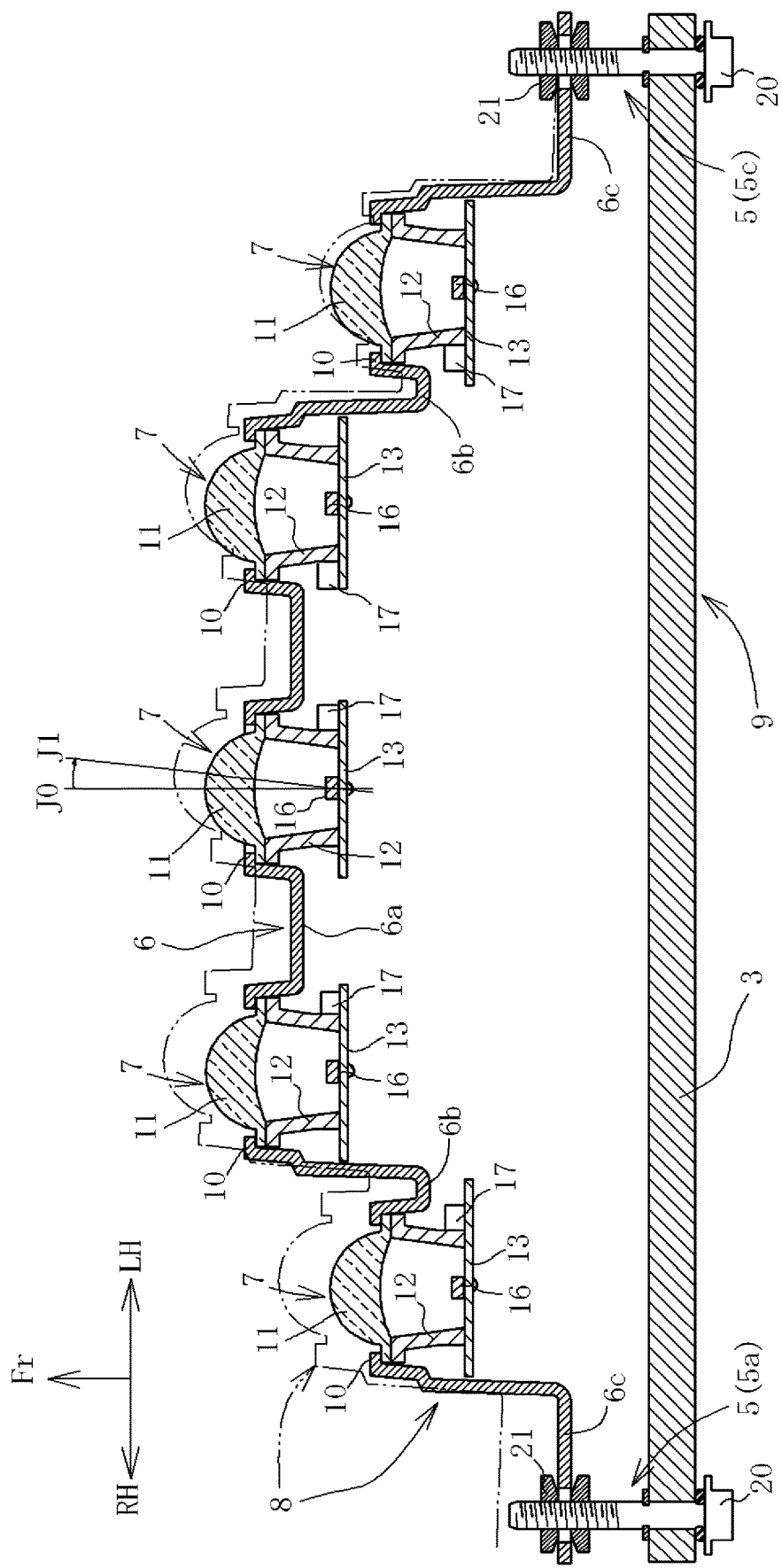
FIG. 4 is a sectional view of the main unit of the headlight taken along a line 4-4 in FIG. 2.

FIGS. 2 to 4 show the lamp assembly 8 in conjunction with the housing 3 and the optical axis adjusters 5. FIG. 2 is a front view, FIG. 3 is a perspective view, and FIG. 4 is a sectional view taken along the line 4-4 in FIG. 2. FIG. 2 shows the outer lens 2 by an imaginary line.

As shown in these drawings, a tubular step part 10 is formed at a front surface of the extension 6 so as to protrude toward the front side, and a projection lens 11 of the lamp unit 7 is fitted into the step part 10 to cause a front surface to protrude from the step part 10 toward the front side.

The extension 6 is made of an appropriate material of metal or resin. In this example, the extension 6 is made of a thermoplastic colored resin and is formed in an approximately rectangular shape long in the left-right direction (vehicle width direction) as viewed from the front (FIG. 2). This shape is merely an example, and the extension 6 is formed in any shape according to various designs of the headlight 1.

The extension 6 is made opaque as a whole, so as not to transmit light and not to allow the inside to be viewed from the outside therethrough. The means of making the extension 6 opaque includes, for example, forming using a colored resin material as the material of the extension 6 and forming an opaque surface layer by coating, plating, or other method. In this example, the extension 6 is made opaque by using a colored resin material.

The lamp unit 7 includes the projection lens 11, a lens holder 12, and a substrate 13 that are integrated, and the lamp unit 7 is supported by the extension 6. The projection lens 11 is made of a convex lens. The lens holder 12 has a tubular shape for holding the projection lens 11. The substrate 13 is provided with an electric circuit for lighting a light source, which will be described later. The lamp unit 7 is fixed to the extension 6 by each type of methods including tightening using a screw or other fittings, bonding, and laser welding. The laser welding will be described later.

As shown in FIG. 2, the extension 6 has a right side 6d, a left side 6e, an upper side 6f, and a lower side 6g as viewed the front.

In this example, a first optical axis adjuster 5a is provided at a lower right corner at which the right side 6d and the lower side 6g join to each other, a second optical axis adjuster 5b is provided at an upper left corner at which the left side 6e and the upper side 6f join to each other, and a third optical axis adjuster 5c is provided at a lower left corner at which the left side 6e and the lower side 6g join to each other. The optical axis is adjusted in the left-right direction and the up-down direction by using these three points. In this example, the third optical axis adjuster 5c functions as a supporting point.

Figure 5:
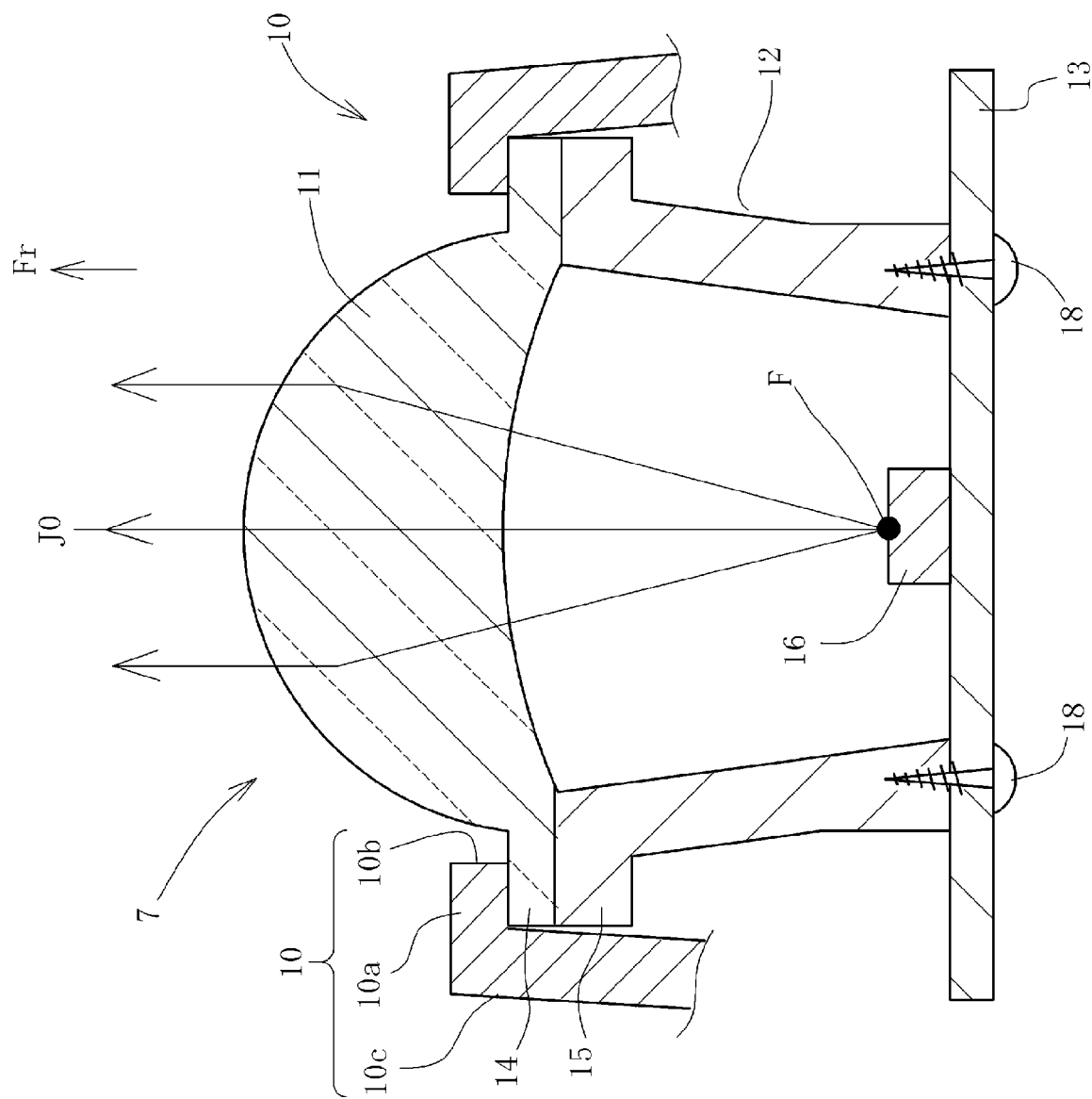
FIG. 5 is an enlarged sectional view of a lamp unit taken along a line 5-5 in FIG. 1.

FIG. 5 is an enlarged sectional view of the lamp unit 7 taken along a line 5-5 in FIG. 1. The lamp unit 7 includes the projection lens 11 and the tubular lens holder 12. The lens holder 12 is formed tapered approximately toward the rear side (lower direction in this drawing). The projection lens 11 is mounted at the opening on the front side of the lens holder 12. The lens holder 12 is made of an appropriate material of metal or resin. In this example, the lens holder 12 is formed by using thermoplastic colored resin and is made opaque as a whole. The means of making the lens holder 12 opaque includes forming an opaque surface layer by coating, plating, or other method, as in the case of the extension 6, as described above.

The projection lens 11 is a convex lens and integrally has a lens flange 14 with an outer flange shape that extends radially outward from the circumference of the projection lens 11. The lens flange 14 is overlapped on a holder flange 15 with an outer flange shape formed at an end surface on the front side of the lens holder 12, and the projection lens 11 and the lens holder 12 are integrally joined by an appropriate method such as bonding.

A part of the step part 10 covers the lens flange 14. That is, the step part 10 has a step shape with an approximately L-shaped cross section and has a flat part 10a with an inner flange shape so as to mount on the lens flange 14.

The flat part 10a is formed with a circular opening that serves as a lens hole 10b, from which the projection lens 11 protrudes toward the front side. The lens hole 10b is an example of a lamp hole of the present application.

The step part 10 has a tubular part 10c that bends from the flat part 10a toward the lower side in the drawing to continue to the extension 6. The tubular part 10c protrudes toward the front side integrally from the upper step 6a (or the middle step 6b) of the extension 6 by a predetermined height.

The lens flange 14 of the projection lens 11 and the flat part 10a of the step part 10 are joined by an appropriate method such as bonding, thereby integrating the lamp unit 7 and the extension 6.

The circumference of the projection lens 11 and the step part 10 of the extension 6 are brought into close contact with each other without a space. The circumference of the projection lens 11 and the step part 10 of the extension 6 do not to have therebetween a conventional space for adjusting the optical axis, which is formed between the circumference of the projection lens and the extension.

The space for adjusting the optical axis of a conventional headlight is large enough to be viewable and to allow the inside structure of the housing, the optical axis adjuster, and other components, to be viewed therethrough. On the other hand, the circumference of the projection lens 11 and the step part 10 of the extension 6 are brought into close contact with each other without a space in the present application. This represents a condition in which the space that is large enough to allow the inside structure to be viewed and to be visually observed is not formed between the circumference of the projection lens 11 and the extension 6.

The length in the front-rear direction (length in the upper-lower direction in the drawing) of the lens holder 12 is approximately the same as a rear-side focal distance of the projection lens 11. The substrate 13 is attached with a screw 18 so as to cover an opening on the rear side of the lens holder 12. The rear-side focus is denoted by "F".

The substrate 13 includes a semiconductor light source 16 that is provided approximately at the rear-side focus F of the projection lens 11. The semiconductor light source 16 is made of an LED.

The semiconductor light source 16 generates light upon being supplied with electric power from the substrate 13 and emits the generated light toward the front side. The light that is emitted from the semiconductor light source 16 is refracted at the projection lens 11 into approximately parallel beams and illuminate the front. The symbol "17" denotes a coupler that couples the circuit of the substrate 13 to a power source line or other component (not shown).

Figure 6:
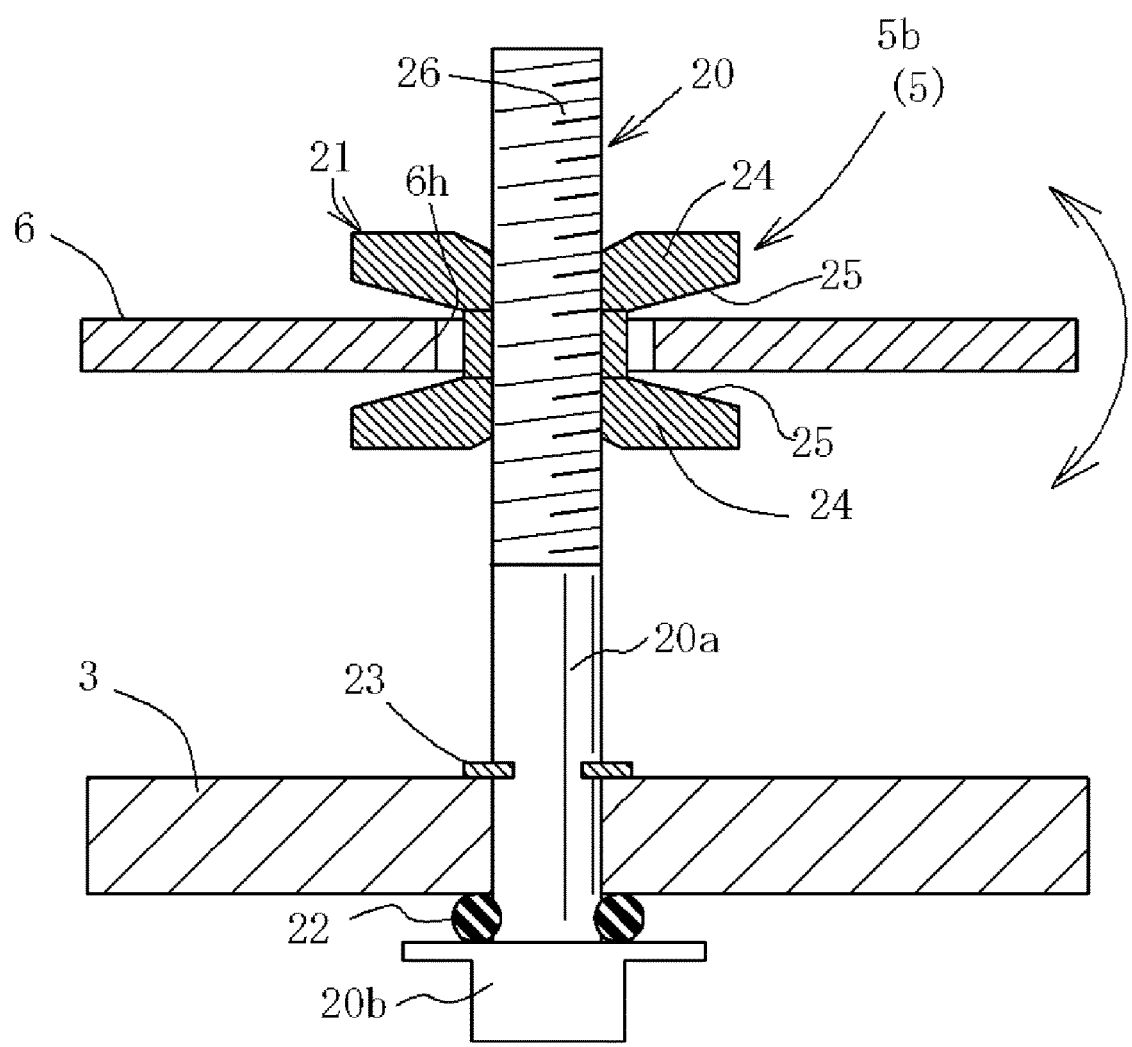
FIG. 6 is a sectional view of an optical axis adjuster.

FIG. 6 is a sectional view showing the second optical axis adjuster 5b as the optical axis adjuster 5. The first optical axis adjuster 5a and the third optical axis adjuster 5c have structures similar to that of the second optical axis adjuster 5b. The optical axis adjuster 5 is the same as one that is conventionally used.

The second optical axis adjuster 5b (optical axis adjuster 5) includes an adjust bolt 20 and an adjust nut 21. The adjust bolt 20 is attached the housing 3. The adjust nut 21 is attached to the extension 6 to be tightened with the adjust bolt 20.

The adjust bolt 20 has a shank 20a and a head 20b that are passed through a bolt passing hole 3a of the housing 3 from the lower side in the drawing. The head 20b and a rear surface (lower surface in the drawing) of the housing 3 have an elastic body 22 that is interposed therebetween as a seal. The elastic body 22 is formed of a rubber O-ring or other material. The shank 20a is retained in the housing 3 by a clip 23. The clip 23 is formed of a publicly known material such as a C-ring or an E-ring.

The adjust nut 21 is tightened in the vicinity of a large-diameter hole 6h that is provided at an end of the extension 6, to the screw part 26 of the adjust bolt 20 that passes through the large-diameter hole 6h. The adjust nut 21 has a holding part 24 that holds upper and lower sides of the extension 6 around the large-diameter hole 6h. The holding part 24 is formed with a tapered surface 25 in which a radially outward side is gradually separated from the surface of the extension 6.

The screw part 26 of the adjust bolt 20 penetrates through the centers of the large-diameter hole 6h and the adjust nut 21. Rotating the adjust bolt 20 makes the adjust nut 21 advance or retreat on the adjust bolt 20 to change the tilt of the extension 6.

As shown in FIG. 2, the first optical axis adjuster 5a and the third optical axis adjuster 5c being a supporting point are on an up-down adjusting axis line L1, and the second optical axis adjuster 5b and the third optical axis adjuster 5c are on a left-right adjusting axis line L2.

In these conditions, when the adjust bolt 20 at the first optical axis adjuster 5a is rotated, the adjust nut 21 advances or retreats, and as shown by an imaginary line in FIG. 4, the lamp assembly 8 makes the extension 6 turn and tilt around the left-right adjusting axis line L2 centering on the supporting point at the third optical axis adjuster 5c.

Assuming that the adjust nut 21 at the first optical axis adjuster 5a is moved to the upper side in FIG. 4, as shown by the imaginary line, the extension 6 tilts to the left side, thereby making an original optical axis J0 move to a position of an optical axis J1, whereby the optical axis is adjusted in the left-right direction. Reversely rotating the adjust bolt 20 makes the optical axis being adjusted in the reverse direction.

Figure 7:
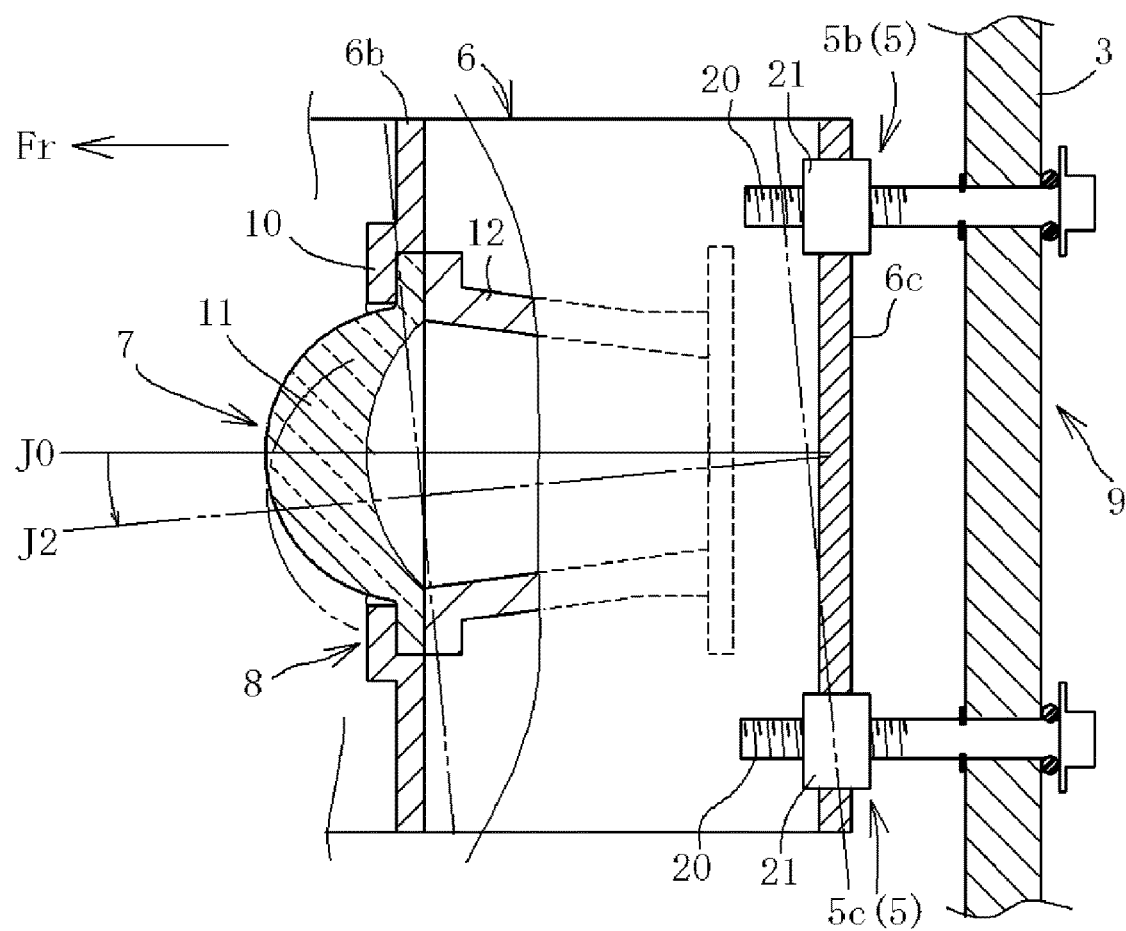
FIG. 7 is a sectional view of the main unit of the headlight taken along a line 7-7 in FIG. 2.

In the condition as shown in FIG. 2, when the adjust bolt 20 of the second optical axis adjuster 5b is rotated, the extension 6 tilts around the up-down adjusting axis line L1. This optical axis adjustment in the up-down direction is shown in FIG. 7. FIG. 7 is a sectional view taken along a line 7-7 in FIG. 2. In this case, each of the second optical axis adjuster 5b and the third optical axis adjuster 5c is shown in the drawing in a simplified manner.

As shown in FIG. 7, for example, when the adjust nut 21 is moved toward the front side, the extension 6 tilts downwardly with the supporting point at the third optical axis adjuster 5c, and the optical axis is adjusted from the original optical axis J0 to an optical axis J2 that faces downward. Reversely rotating the adjust bolt 20 makes the optical axis being adjusted in the reverse direction.

Next, a method of joining the projection lens 11 and the lens holder 12 will be described. Although this joining is performed by any appropriate method such as bonding, it is performed efficiently by laser welding.

Figure 8:
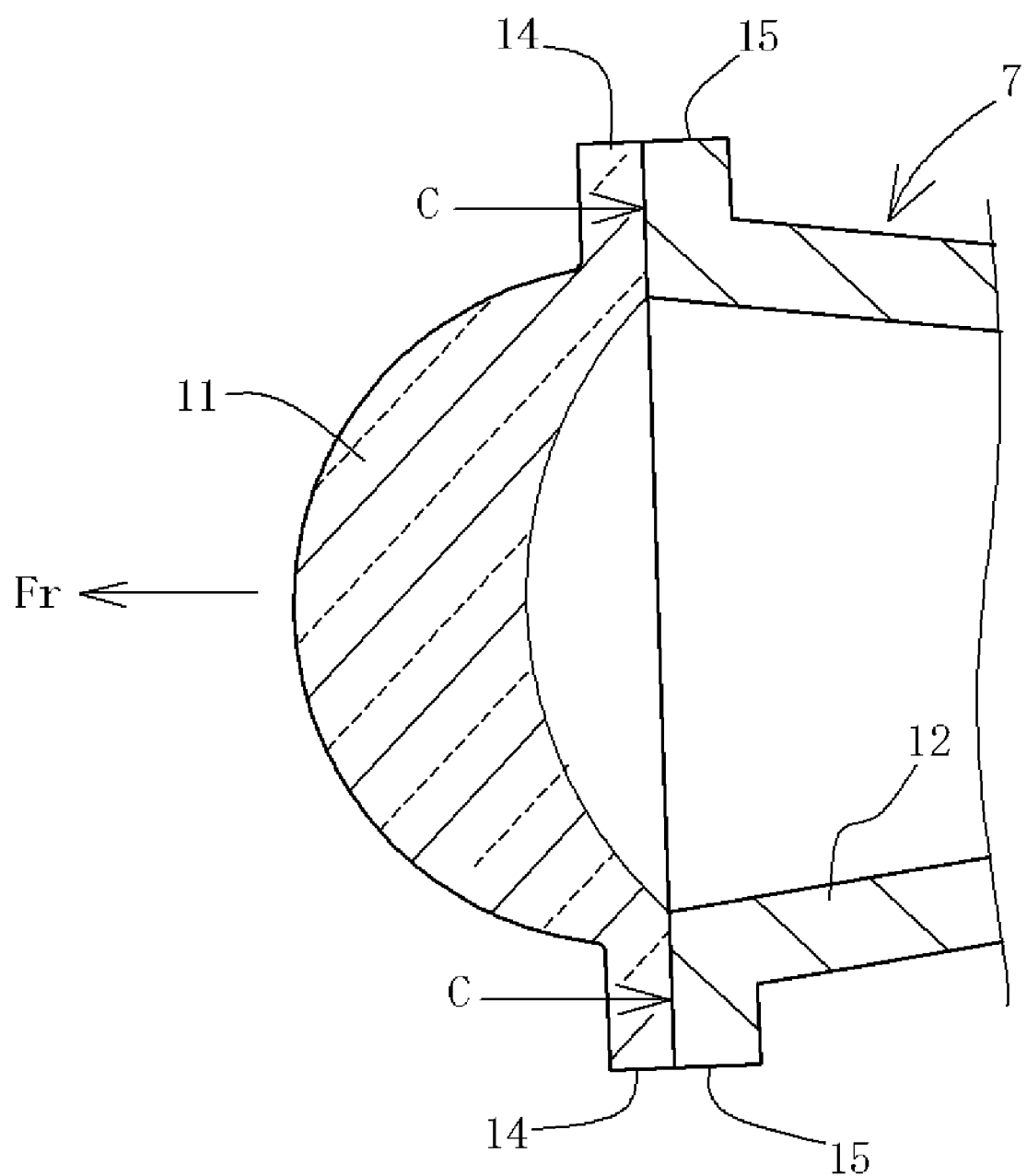
FIG. 8 is a sectional view showing a process of laser welding a projection lens and a lens holder.

FIG. 8 shows a method of joining using laser welding. First, the lens flange 14 of the projection lens 11 is overlapped on the holder flange 15 of the lens holder 12 from the front side, and laser light C is emitted to the lens flange 14 from the front side.

The emitted laser light C transmits the lens flange 14 because the lens flange 14 is transparent. However, the laser light C does not transmit the holder flange 15 of the lens holder 12 because the holder flange 15 is made of an opaque thermoplastic colored resin, and the laser light C illuminates and melts an end surface of the holder flange 15 of the lens holder 12.

Thus, the laser light C is emitted from the front side while using the transparent projection lens 11, whereby the lens flange 14 is easily and rapidly welded to an end surface of the lens holder 12 and is efficiently integrated therewith.

The welded positions are provided at equal intervals or at unequal intervals in the circumferential direction. It is sufficient to provide a relatively small number of the welded positions, such as three or four welded positions.

Figure 9:
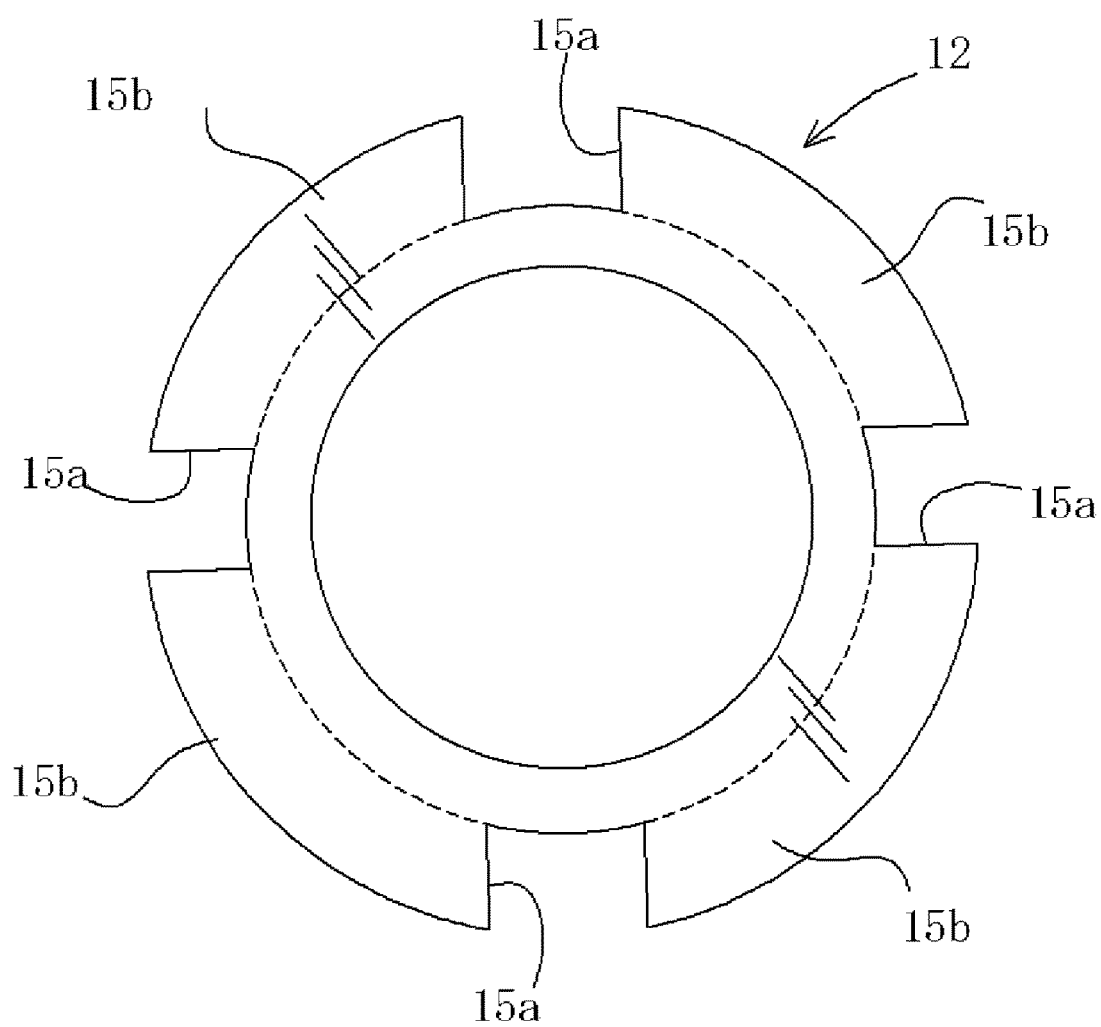
FIG. 9 shows a modification example of a holder flange.

In this case, instead of forming the holder flange 15 with a ring shape continuous over the entire circumference, as shown in FIG. 9, the holder flange 15 may be provided as protrusions 15b that are intermittently formed in the circumferential direction by cut parts 15a. The number of the protrusions 15b is made to agree with the number of the welded positions. For example, four protrusions 15b may be provided at equal intervals in the circumferential direction, and the lens flange 14 may be overlapped and laser welded to these protrusions 15b.

In a case in which an end surface of the opening of the lens holder 12 is formed with a sufficiently large width, the protrusions 15b and the entire circumferential holder flange 15 are not necessary, and the lens flange 14 can be directly welded to the end surface of the lens holder 12. Laser welding enables welding a relatively small area as in the end surface of the opening of the lens holder 12.

It is also possible to adopt the laser welding to join the projection lens 11 and the extension 6. The following describes joining of the projection lens 11 and the extension 6 by laser welding.

Figure 10:
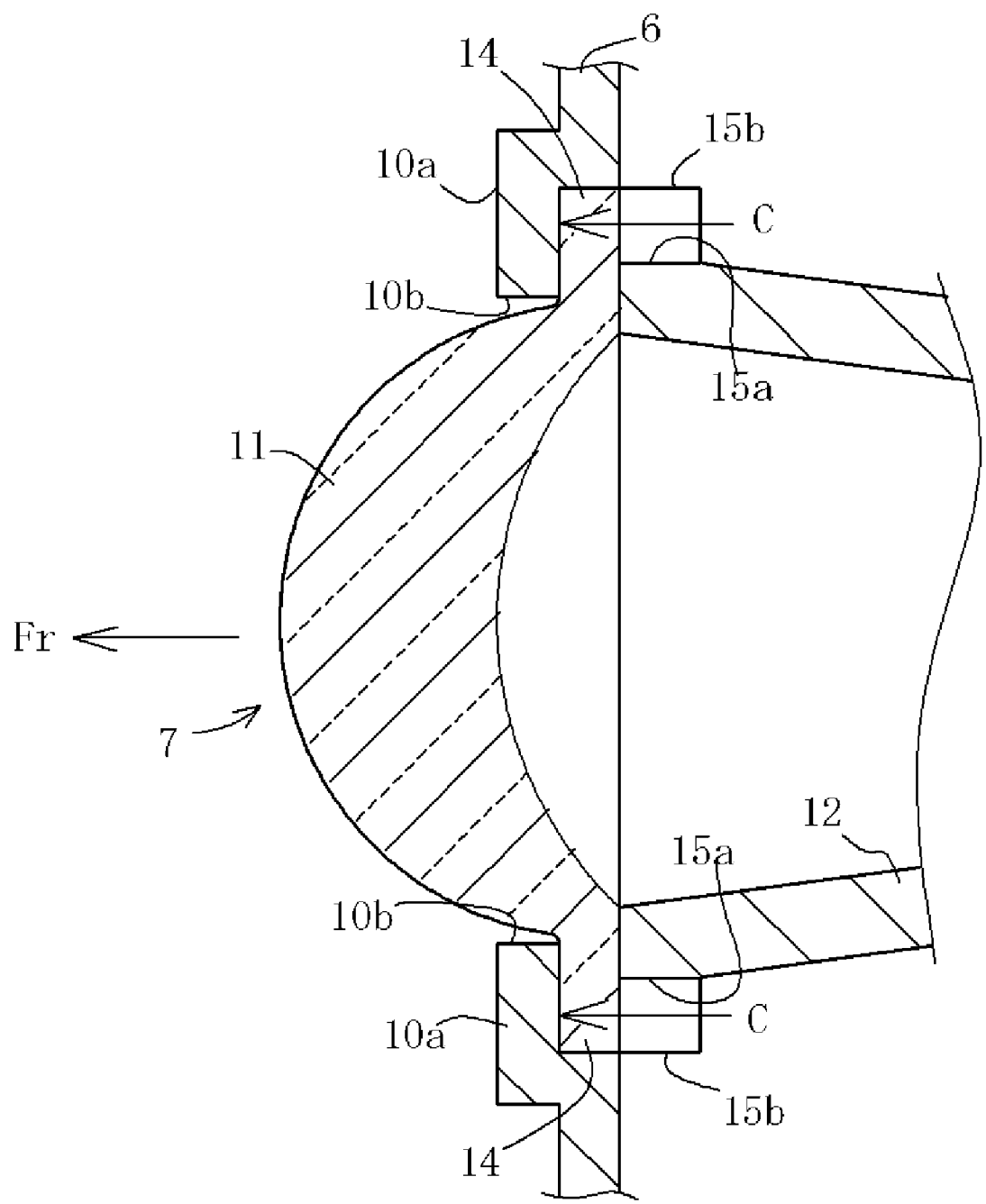
FIG. 10 is a sectional view showing a process of laser welding the projection lens to a rear side of an extension.

FIG. 10 shows an example of welding the extension 6 to the front side of the lens flange 14 of the projection lens 11. As shown in the drawing, the projection lens 11 is fitted into the lens hole 10b of the step part 10, which is formed on the extension 6, and the flat part 10a is overlapped on the front side of the lens flange 14. The flat part 10a corresponds to an overlapping portion of the present application. The flat part 10a is overlapped on the lens flange 14.

In this case, the extension 6 is formed of thermoplastic resin that is colored so as to be opaque for not transmitting light and that melts by heat.

As shown in FIG. 9, the holder flange 15 of the lens holder 12 has the cut parts 15a that are provided in accordance with the positions to be laser welded, and the cut parts 15a and the protrusions 15b are alternately formed in the circumferential direction.

In these conditions, when the laser light C is emitted into the cut part 15a from the rear side, the laser light C transmits the cut part 15a, further transmits the transparent lens flange 14, and illuminates and melts the flat part 10a of the extension 6, which is the colored opaque thermoplastic resin. Thus, the extension 6 and the projection lens 11 are integrally welded via the lens flange 14.

In the case of thus performing laser welding from the rear side, if the substrate 13 is attached to the lens holder 12 in advance, the substrate 13 may prevent the laser light from illuminating the part of the lens flange 14 in some cases (refer to FIG. 5). For such cases, the projection lens 11 that is integrated with the lens holder 12, and the extension 6, are welded prior to attaching the substrate 13 to the lens holder 12.

On the other hand, the lens flange 14 may be made larger than the substrate 13 to overhang more than the substrate 13 or the substrate 13 may be provided with a hole or a cut part through which the lens flange 14 is viewable from the rear side. In this case, the laser welding can be performed in the condition in which the substrate 13 is preliminarily attached to the lens holder 12.

Figure 11:
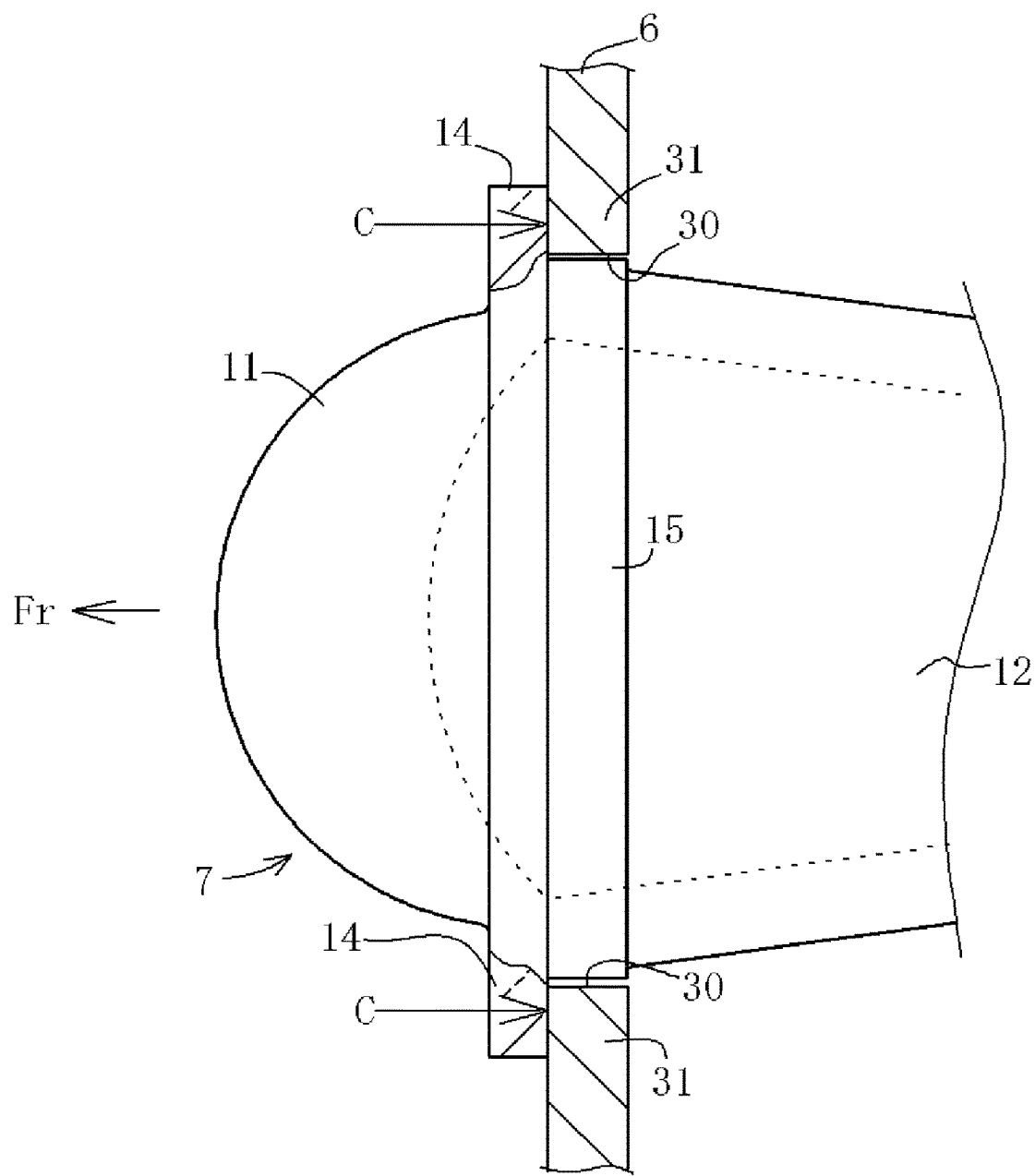
FIG. 11 is a sectional view showing a process of laser welding the projection lens to a front side of the extension.

FIG. 11 shows an example of welding the extension 6 to a rear side of the lens flange 14, in contrary to the example shown in FIG. 10. In this example, a holder hole 30 for fitting the holder flange 15 of the lens holder 12 is provided to the extension 6 (refer to FIG. 12). The holder hole 30 is an example of a lamp hole of the present application.

Figure 12:
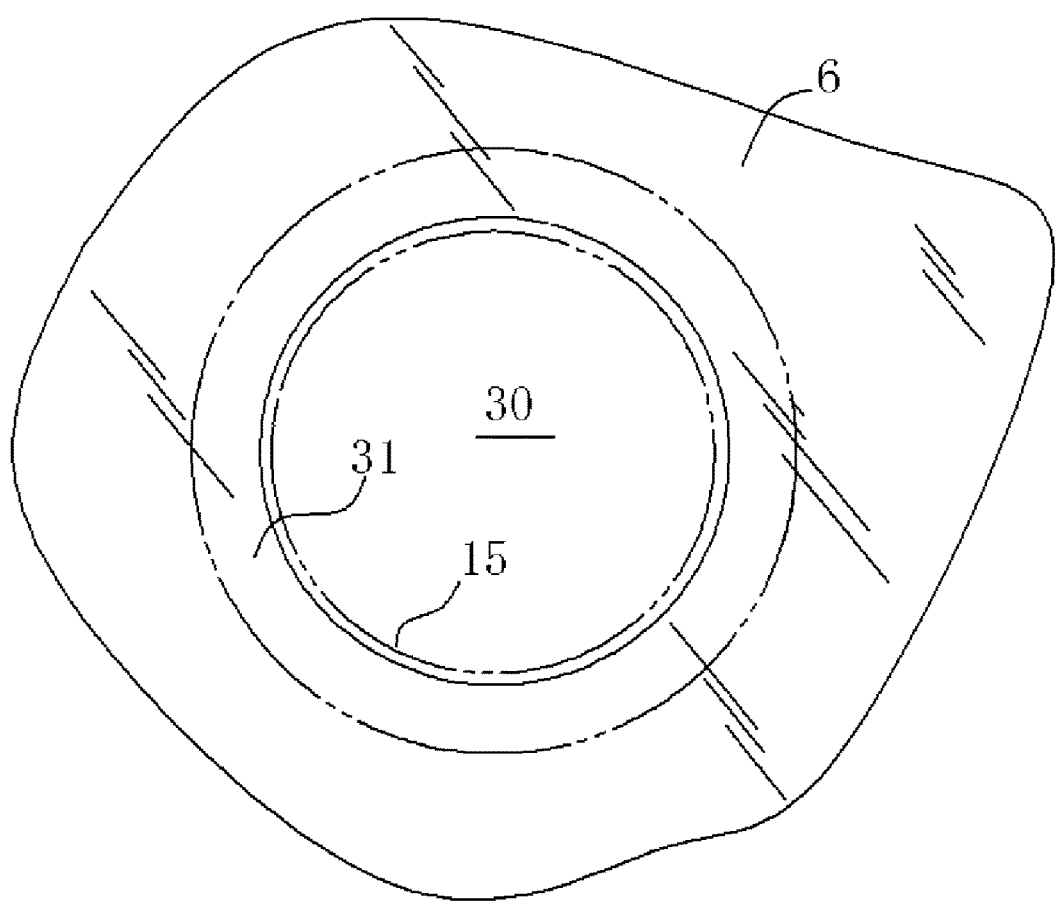
FIG. 12 shows a part of a lamp hole of the extension.

FIG. 12 shows the holder hole 30 and the surrounding extension 6. The holder hole 30 receives the holder flange 15 that protrudes radially outward by a relatively small amount.

The circumference of the holder hole 30 is formed into an overlapping portion 31 on which the lens flange 14 is overlapped from the front side.

As shown in FIG. 11, the lens holder 12 is fitted into the holder hole 30 from a small-diameter side (rear side), and the lens flange 14 of the projection lens 11, which is preliminarily mouthed to the holder flange 15 by bonding or other means, is overlapped on the overlapping portion 31 from the front side. In these conditions, the laser light C is emitted from the front side to the lens flange 14. The emitted laser light C transmits the lens flange 14 and illuminates and melts the opaque overlapping portion 31, thereby welding the overlapping portion 31 on the rear side of the lens flange 14.

Next, the effects of this example will be described. As shown in FIG. 5, the lens flange 14 of the projection lens 11 is overlapped on the holder flange 15 of the lens holder 12 and is joined thereto by bonding or other means. As a result, a space that is large enough to allow the inside structure to be viewed and to be visually observable is not formed between the projection lens 11 and the extension 6. Thus, it is possible to eliminate a conventional space for adjusting the optical axis, and the inside structure is not viewable from between the extension 6 and the lamp unit 7, whereby a good appearance is obtained.

The lamp unit 7 is fixed on the extension 6 and is integrated therewith. This enables the optical axis adjusters 5 to change the tilt of the extension 6, thereby adjusting the optical axis.

During the optical adjustment, the lamp unit 7 and the extension 6 keep no space therebetween, whereby a good appearance is maintained.

In addition, the optical axis adjuster 5 has the same structure as that of a conventional one, and therefore, a conventional component can be used without changing, thereby improving versatility.

The circumference of the projection lens 11 is provided with the ring-shaped step part 10 that covers the lens flange 14 at a rim part of the projection lens 11. Thus, while light that is emitted from the semiconductor light source 16 toward the front side transmits the projection lens 11, the step part 10 prevents the light from leaking from the circumference of the projection lens 11, thereby improving quality of the headlight 1.

In addition, the step part 10 is easily formed as a part of the extension 6, and the step part 10 can also be used as a fixing part for the projection lens 11.

As shown in FIGS. 8, 10, and 11, the laser light C is emitted through the transparent lens flange 14 of the projection lens 11 to the overlapping portion 31 (10a) of the extension 6, which is made of the opaque thermoplastic resin, or to the holder flange 15 of the lens holder 12. Thus, the overlapping portion 31 (10a) or the holder flange 15 is melted and is welded to the lens flange 14. The projection lens 11 and the extension 6 or the lens holder 12 are efficiently joined together by laser welding.

As a result, it is possible to rapidly and easily join the lamp unit 7 and the extension 6 and join the projection lens 11 and the lens holder 12 by laser welding while using the transparent lens flange 14.

Thus, the laser welding is suitable for manufacturing the headlight 1 having the lamp unit 7 that is fixed to the extension 6.

Figure 13:
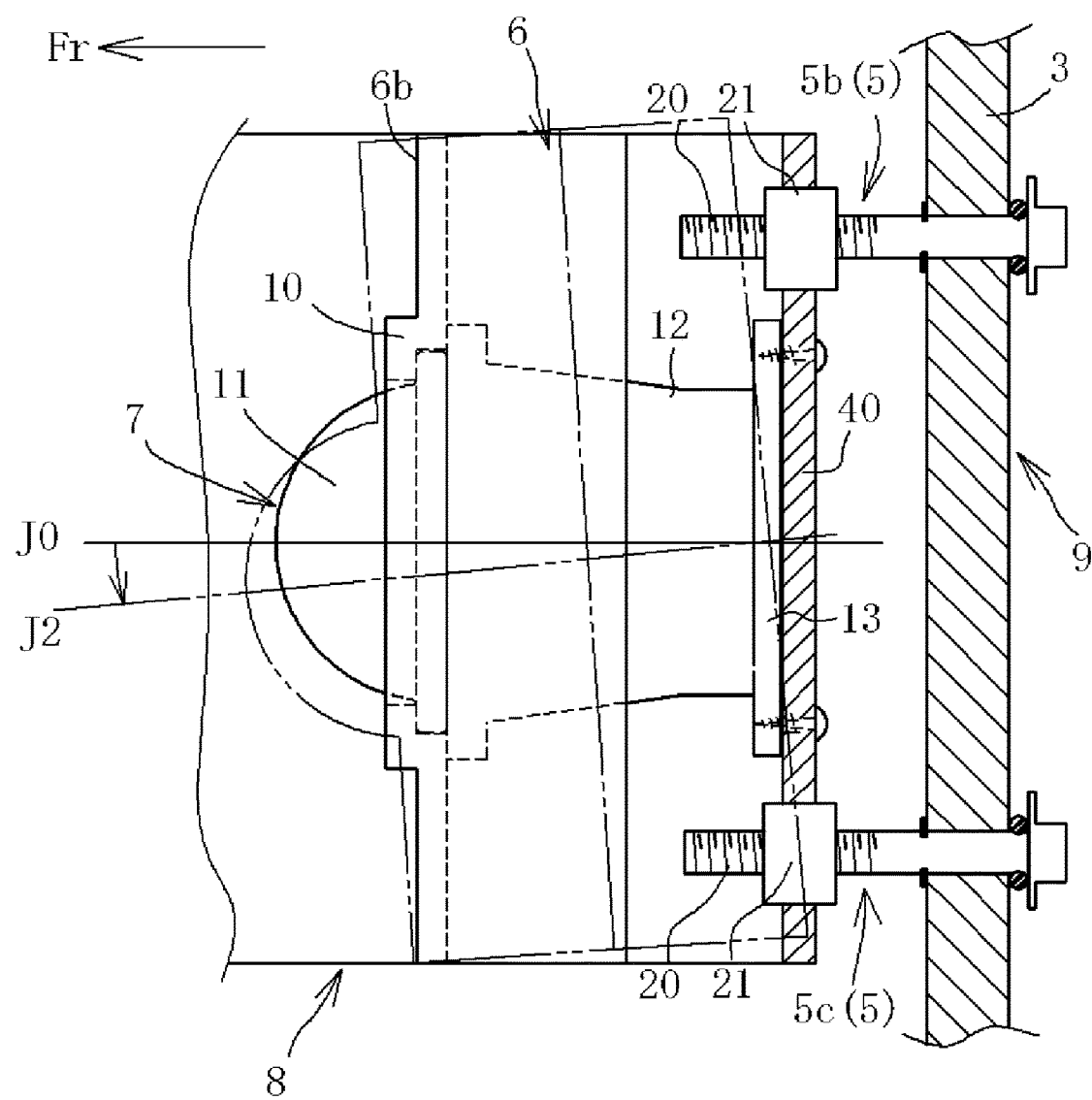
FIG. 13 is a sectional view of a part approximately corresponding to that shown in FIG. 7, according to a second example.

Next, another example will be described. FIG. 13 relates to a second example in which the optical axis of the lamp unit 7 is directly adjusted. FIG. 13 is a sectional view of a part similar to that shown in FIG. 7. The parts that are common between the forgoing example and this example are denoted by common symbols. In this example, one or multiple lamp units 7 are mounted on a bracket 40 (the drawing shows only one lamp unit 7 as an example). The bracket 40 is coupled to the housing 3 by the optical axis adjusters 5 so as to enable optical axis adjustment. The optical axis adjusters 5 are similar to those used in the first example. Each of the optical axis adjusters 5 is shown in a simplified manner.

In the case of providing three optical axis adjusters 5 of the first optical axis adjuster 5a, the second optical axis adjuster 5b, and the third optical axis adjuster 5c, as in FIG. 2, the bracket 40 having dimensions and a shape that enable attaching these optical axis adjusters is provided.

The lamp unit 7 is fixed to the extension 6 and is integrated therewith, thereby constituting the lamp assembly 8. The lamp unit 7 is joined so as to have an integrated structure similar to that in the forgoing example. Thus, a large space corresponding to a conventional space for adjusting the optical axis is not formed between the extension 6 and the lamp unit 7, and more exactly, between the projection lens 11 protruding from the extension 6 and the surrounding extension 6.

The extension 6 is different from that in the forgoing example. The extension 6 is not directly coupled to the housing 3, but is indirectly supported by the housing 3 via the lamp unit 7 in a condition of being separated from the housing 3.

In these conditions, when the optical axis is adjusted by the optical axis adjusters 5, as shown by imaginary lines, the bracket 40 tilts while the lamp assembly 8 tilts integrally with the bracket 40. As a result, the lamp unit 7 also tilts together with the bracket 40, whereby the optical axis is adjusted. At this time, the extension 6 also tilts in an integral manner.

The optical axis can be adjusted also by this method. The extension 6 and the lamp unit 7 have no space therebetween, thereby preventing the optical axis adjusters 5 and other components in the housing 3 from being viewed from the outside through the outer lens 2. Thus, a good appearance is obtained and is maintained.

The invention of the present application is not limited to the forgoing examples, and various modifications and alterations are possible within the gist of the invention.

For example, the fixing structure of the lamp unit 7 to the extension 6 is freely selected, and instead of the projection lens 11, the lens holder 12 may be fixed to the extension 6 by any appropriate method.

If the projection lens 11 is fixed to the extension 6, the inside structure is hidden by the extension 6 by the maximum amount.

The step part 10, the lens flange 14, and the holder flange 15, and other components are not essential, and it is possible to omit any one or all of these components. Even in the case of omitting the lens flange 14, the extension 6 and the lens holder 12 can be laser welded, as described above, by making laser light transmit a circumferential part of the transparent projection lens 11.

The light source of the lamp unit 7 can also use any publicly known components other than the semiconductor light source 16.

The headlight 1 can also be used in each type of vehicles other than the motorcycle.

INDUSTRIAL APPLICABILITY

The present invention relates to a supporting structure of a lamp unit in a headlight and enables making the headlight have a good appearance, and therefore, the present invention is useful in the field of vehicle headlight.

REFERENCE SIGNS LIST

1: headlight, 2: outer lens, 3: housing, 4: light chamber, 5: optical axis adjuster, 6: extension, 7: lamp unit, 8: lamp assembly, 10: step part, 11: projection lens, 12: lens holder, 13: substrate, 14: lens flange, 15: holder flange, 16: semiconductor light source, 20: adjust bolt, 21: adjust nut

The invention claimed is:

1. A lamp unit supporting structure for a headlight, the headlight comprising:
an outer lens;
a housing having a front surface opening that is covered with the outer lens;
multiple lamp units contained in a light chamber that is formed by the outer lens and the housing;
an extension disposed between the lamp unit and the outer lens; and
an optical axis adjuster configured to adjust an optical axis by changing a tilt of the lamp unit,
wherein the lamp units include a light source, a projection lens, and a tubular lens holder, the light source being made of an LED, the projection lens being configured to collect light from the light source, and the lens holder being integrally joined to the projection lens at a front-side opening and integrated with the light source at a rear-side opening, wherein the extension has a lamp hole to which the projection lens is tightly fitted and also having an overlapping portion that is a circumferential edge part of the lamp hole and that overlaps the circumferential edge part of the projection lens, wherein the lamp units each have the projection lens that is tightly fitted to the lamp hole, the overlapping portion and the circumferential edge part of the projection lens being overlapped and joined together, thereby fixing the projection lens to the extension, and wherein the extension and the lamp unit are configured to tilt integrally in adjusting the optical axis.

2. The lamp unit supporting structure for the headlight according to claim 1, wherein the extension is supported by the housing, and the optical axis adjuster is provided between the housing and the extension.

3. The lamp unit supporting structure for the headlight according to claim 1, wherein the lamp unit is supported by the housing, the optical axis adjuster is provided between the housing and the lamp unit, and the extension is supported by the housing via the lamp unit.

4. The lamp unit supporting structure for the headlight according to claim 1, wherein the circumferential edge part of the projection lens has a lens flange that is formed around the projection lens and that extends radially outward, and the overlapping portion of the extension forms a ring-shaped step part that covers the lens flange.

5. The lamp unit supporting structure for the headlight according to claim 4, wherein the projection lens has a welded portion that is laser welded, between the lens flange and the overlapping portion of the extension.

6. A manufacturing method of the headlight according to claim 1, comprising:

tightly fitting the lamp unit to the lamp hole provided to the extension made of a thermoplastic resin, and the lamp unit having a light source, the projection lens, and the tubular lens holder, the light source being made of an LED, the projection lens configured to collect light from the light source, and the lens holder integrally joined to the projection lens at a front-side opening and integrated with the light source at a rear-side opening;

overlapping a transparent lens flange on an opaque overlapping portion, the lens flange forming a circumferential edge part of the projection lens, and the overlapping portion being a part of a circumference of the lamp hole of the extension;

emitting laser light to the overlapping portion through the lens flange; and performing laser welding of the overlapping portion to the lens flange by melting the overlapping portion.

* * * * *